(12) United States Patent
Takeshige et al.

(10) Patent No.: US 11,445,093 B2
(45) Date of Patent: Sep. 13, 2022

(54) WINDOW CAMERA

(71) Applicant: PANASONIC INTELLECTUAL PROPERTY MANAGEMENT CO., LTD., Osaka (JP)

(72) Inventors: Ryota Takeshige, Fukuoka (JP); Jumpei Hironaka, Fukuoka (JP); Junichi Matsuda, Fukuoka (JP); Yasuhiro Nomiyama, Fukuoka (JP); Takashi Kihara, Fukuoka (JP); Yuki Kitahara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/140,612

(22) Filed: Jan. 4, 2021

(65) Prior Publication Data

US 2021/0211565 A1    Jul. 8, 2021

(30) Foreign Application Priority Data

Jan. 6, 2020    (JP) .............................. JP2020-000481

(51) Int. Cl.
*G03B 17/02*    (2021.01)
*H04N 5/225*    (2006.01)

(52) U.S. Cl.
CPC ....... *H04N 5/22521* (2018.08); *H04N 5/2252* (2013.01); *H04N 5/2253* (2013.01)

(58) Field of Classification Search
CPC .. G08G 1/01; G08G 1/04; H04N 7/18; H04N 5/22521; H04N 5/2252; H04N 5/2253; G03B 17/02
See application file for complete search history.

(56) References Cited

U.S. PATENT DOCUMENTS

| 5,904,330 A | * | 5/1999 | Manico ................ A01K 39/014 |
| | | | 248/206.3 |
| 2009/0050758 A1 | * | 2/2009 | Carnevali ............... F16B 47/00 |
| | | | 248/205.8 |

(Continued)

FOREIGN PATENT DOCUMENTS

JP    2007-025967    2/2007

*Primary Examiner* — Patrick E Demosky
(74) *Attorney, Agent, or Firm* — Greenblum & Bernstein, P.L.C.

(57) ABSTRACT

A window camera includes: an image capturing unit, a housing, and a light-shielding member. The image capturing unit is configured to capture an image of outdoors from an indoor surface of a window. The housing includes an attachment surface having a rectangular shape and facing in parallel with the indoor surface. In the housing, the image capturing unit is provided to be recessed in the attachment surface such that an optical axis of the image capturing unit is aligned with an intersection of a pair of diagonal lines of the attachment surface. The light-shielding member protrudes from the attachment surface toward the indoor surface and has a rectangular frame shape along an outer shape of the attachment surface. The light-shielding member is formed of an elastic material and elastically deformable by pressing from the housing to close a gap between the indoor surface and the attachment surface.

8 Claims, 13 Drawing Sheets

(56) References Cited

U.S. PATENT DOCUMENTS

| | | | |
|---|---|---|---|
| 2015/0015713 A1* | 1/2015 | Wang | H05K 999/99 |
| | | | 348/148 |
| 2016/0366314 A1* | 12/2016 | Pfaffinger, Jr. | F24C 15/04 |
| 2018/0249901 A1* | 9/2018 | Chinnock | A61B 1/07 |

* cited by examiner

WINDOW CAMERA

CROSS-REFERENCE TO RELATED APPLICATIONS

This application claims the benefit of priority of Japanese Patent Application No. 2020-000481 filed on Jan. 6, 2020, the enter contents of which are incorporated herein by reference.

FIELD

The present disclosure relates to a window camera.

BACKGROUND

In the related art, a camera unit fixed to a flat transparent member such as a window glass is known (JP-A-2007-25967). The camera unit is used for a traffic flow measurement system. The traffic flow measurement system includes a camera unit for acquiring image data by photographing an image, and a traffic flow measurement apparatus for acquiring road traffic information based on the acquired image data. The camera unit includes an image capturing unit, a suction cup that is a fixing portion for fixing the camera unit to the transparent member, and reflection prevention means for preventing reflected light from the transparent member from being reflected on a captured image, is installed indoors in a building that is around a road and includes a window portion partitioned by the transparent member, and photographs an image of a road via the transparent member.

SUMMARY

However, in the camera unit of JP-A-2007-25967, in order to prevent the reflected light from the transparent member from being reflected, it is necessary to close a gap between the image capturing unit and the transparent member (for example, a window) with a light-shielding member (for example, a black paper or a sponge). However, when a user installs the camera unit on a window at home to capture an image of outdoors, the light-shielding member has to be prepared separately, which complicates the installation. Further, in recent years, for a purpose of improving a heat insulation property, a residence that uses a multi-layer glass configured with two or more glasses as a window is increasing. When a camera is installed on such a window, in a captured video captured by the camera, indoor light such as indoor lighting is reflected on a glass on an outdoor side and reflected in the captured video, and image quality of a captured image is reduced.

The present disclosure has been devised in view of the related art described above, an object thereof is to provide a window camera that can be installed on a window and more accurately prevents reflection of indoor light due to reflection on a window glass to improve image quality of a captured image.

The present disclosure provides a window camera including: an image capturing unit configured to capture an image of outdoors from an indoor surface of a window; a housing including an attachment surface having a rectangular shape and facing in parallel with the indoor surface, the housing in which the image capturing unit is provided to be recessed in the attachment surface such that an optical axis of the image capturing unit is aligned with an intersection of a pair of diagonal lines of the attachment surface; and a light-shielding member protruding from the attachment surface toward the indoor surface and having a rectangular frame shape along an outer shape of the attachment surface, the light-shielding member being formed of an elastic material and elastically deformable by pressing from the housing to close a gap between the indoor surface and the attachment surface.

According to the present disclosure, the window camera can be installed on the window, and can more accurately prevent the reflection of the indoor light due to the reflection on the window glass to improve the image quality of the captured image.

DETAILED DESCRIPTION

Hereinafter, an embodiment in which a window camera according to the present disclosure is specifically disclosed will be described in detail with reference to drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Figure 1:
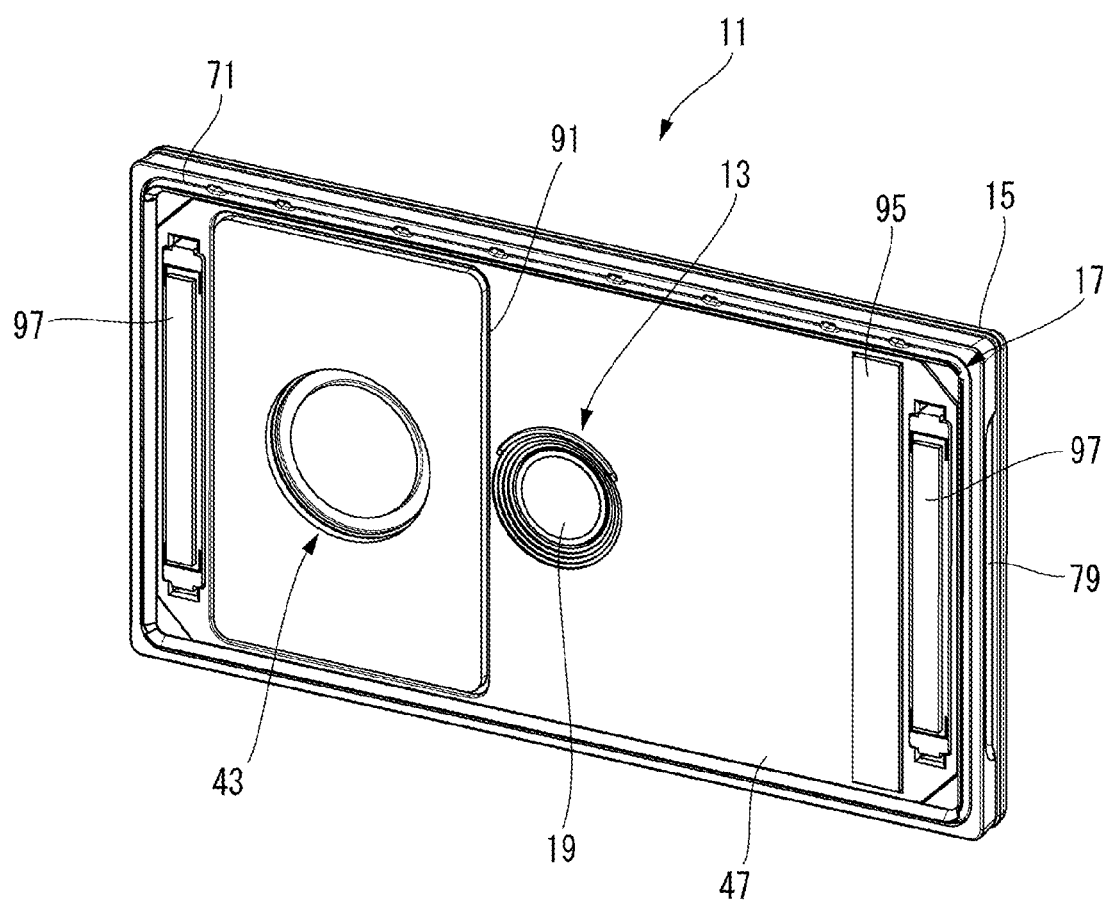
FIG. 1 is an external perspective view of a window camera according to a first embodiment.

FIG. 1 is an external perspective view of a window camera 11 according to a first embodiment. The window camera 11 according to the first embodiment is attached by a user by suction or sticking to an indoor side glass 99 of a window 27 configured with, for example, one or two or more glasses (that is, a multi-layer glass), and captures an image of outdoors via the window 27. The multi-layer glass is not limited to a double-glazed glass (a so-called paired glass) and may be, for example, a triple-glazed glass or a quadruple-glazed glass. As an example of the double-glazed glass, a thickness of each glass is 3 mm, and a distance of a glass interval 31 between two glasses (see FIG. 6) is, for example, 6.35 mm. The multi-layer glass has a heat insulation property higher than that of a single-layer-glass window because dry air is enclosed and sealed in the glass interval 31.

The window camera 11 according to the first embodiment includes at least an image capturing unit 13, a housing 15, and a light-shielding lip 17 (an example of a light-shielding member). The window camera 11 is attached to the indoor side glass 99 by using a suction cup piece 43, or the suction cup piece 43 and a plurality of double-sided tapes 97. Further, the window camera 11 includes a strip-shaped suction piece 95 that is long in a direction along a short side, on an attachment surface 47 on a side opposite to a suction plate 91. The suction piece 95 is formed of an elastic material and can further improve a suction force to the window 27.

Figure 2:
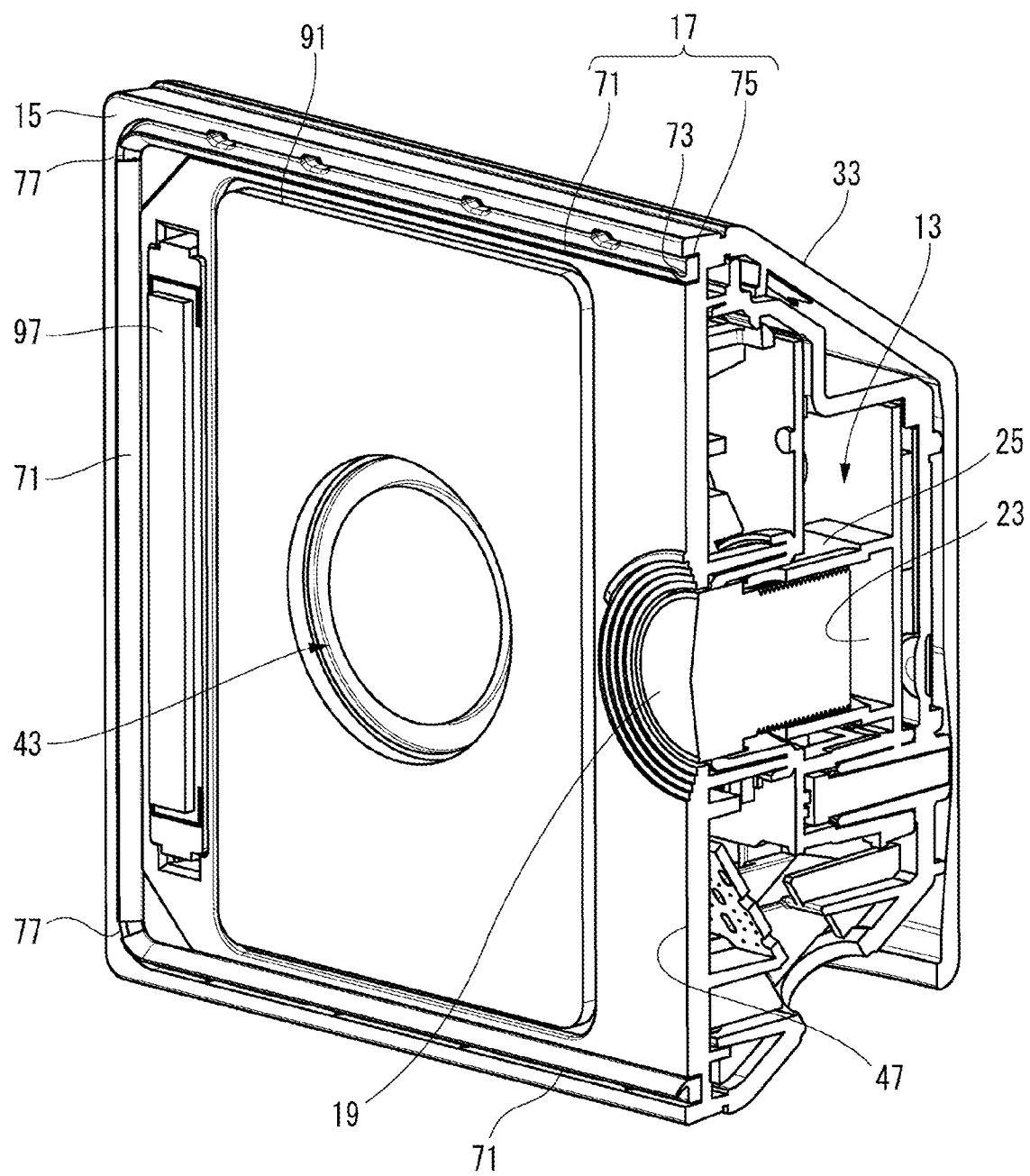
FIG. 2 is a cross-sectional perspective view of the window camera taken along a surface including an optical axis of a lens.

FIG. 2 is a cross-sectional perspective view of the window camera 11 taken along a surface including an optical axis 53 of a lens 19.

The image capturing unit 13 includes at least the lens 19 and an image sensor 23. The image sensor 23 is a solid-state image capturing element such as a charged-coupled device (CCD) or a complementary metal-oxide-semiconductor (CMOS), and converts an optical image, obtained by focusing image capturing light 21 taken in from the lens 19 on an image capturing surface, into an electric signal. The lens 19 is held by a lens holding portion 25. The image sensor 23 is disposed perpendicular to the optical axis 53 of the lens 19. The image capturing unit 13 captures an image of the outdoors from an indoor surface 29 of the window 27 configured with the multi-layer glass.

Figure 3:
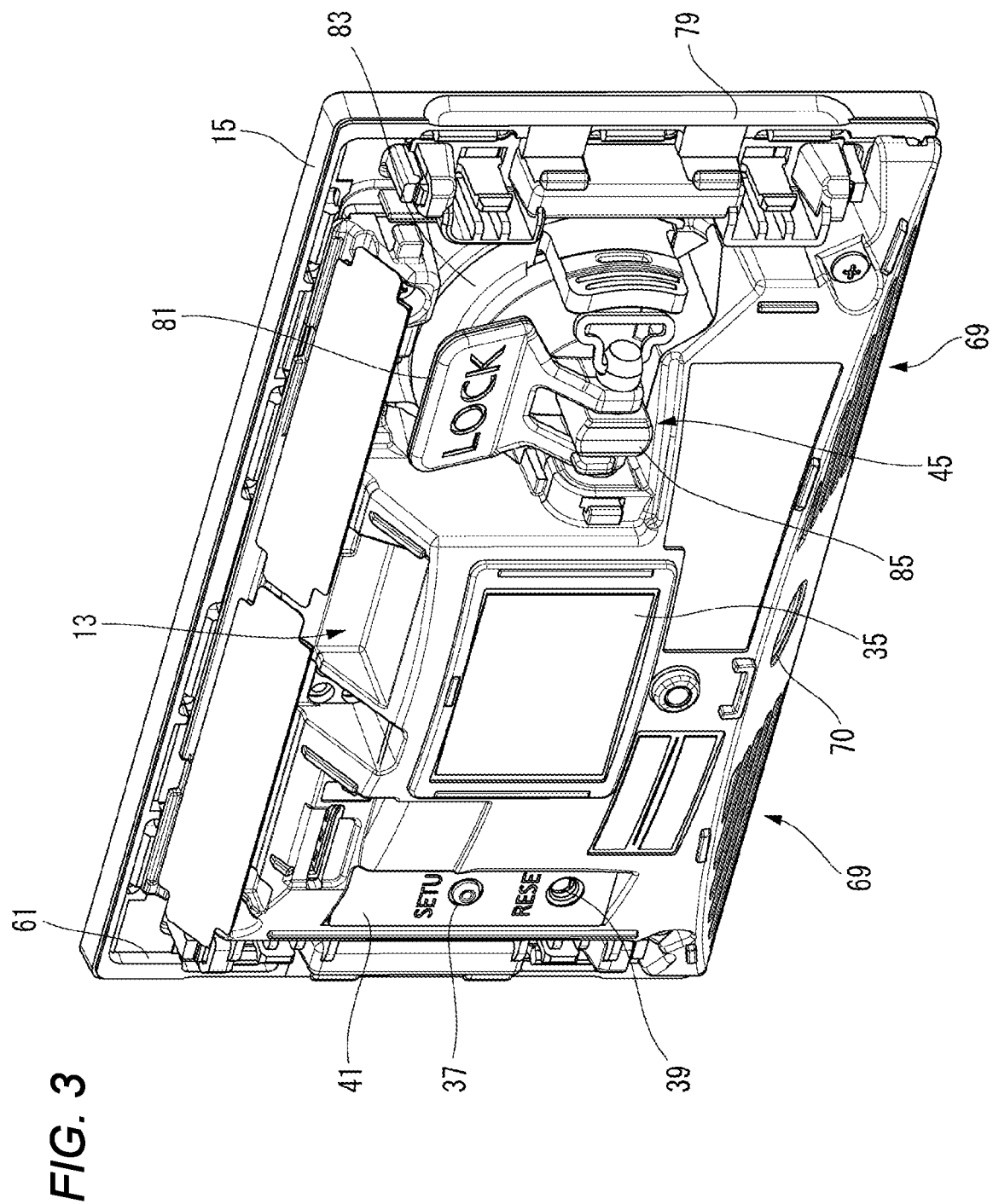
FIG. 3 is a perspective view of the window camera from which a back cover is removed.

FIG. 3 is a perspective view of the window camera 11 from which a back cover 33 is removed. A liquid crystal display apparatus 35 is provided on a back portion of the image capturing unit 13 (in other words, an indoor side). The liquid crystal display apparatus 35 displays a captured image captured by the image capturing unit 13. Accordingly, the window camera 11 enables a user to visually recognize a captured image at an attachment position by a captured image displayed on the liquid crystal display apparatus 35. Further, the window camera 11 is covered by the back cover 33 being attached to the housing 15.

The window camera 11 includes an operation panel 41 including a setting button 37 and a reset button 39 inside the housing 15. A suction cup suction mechanism 45 that operates the suction cup piece 43 shown in FIG. 2 is disposed on one side of the image capturing unit 13. The operation panel 41 and the suction cup suction mechanism 45 are covered by the back cover 33 when the back cover 33 is attached to the housing 15.

Figure 4:
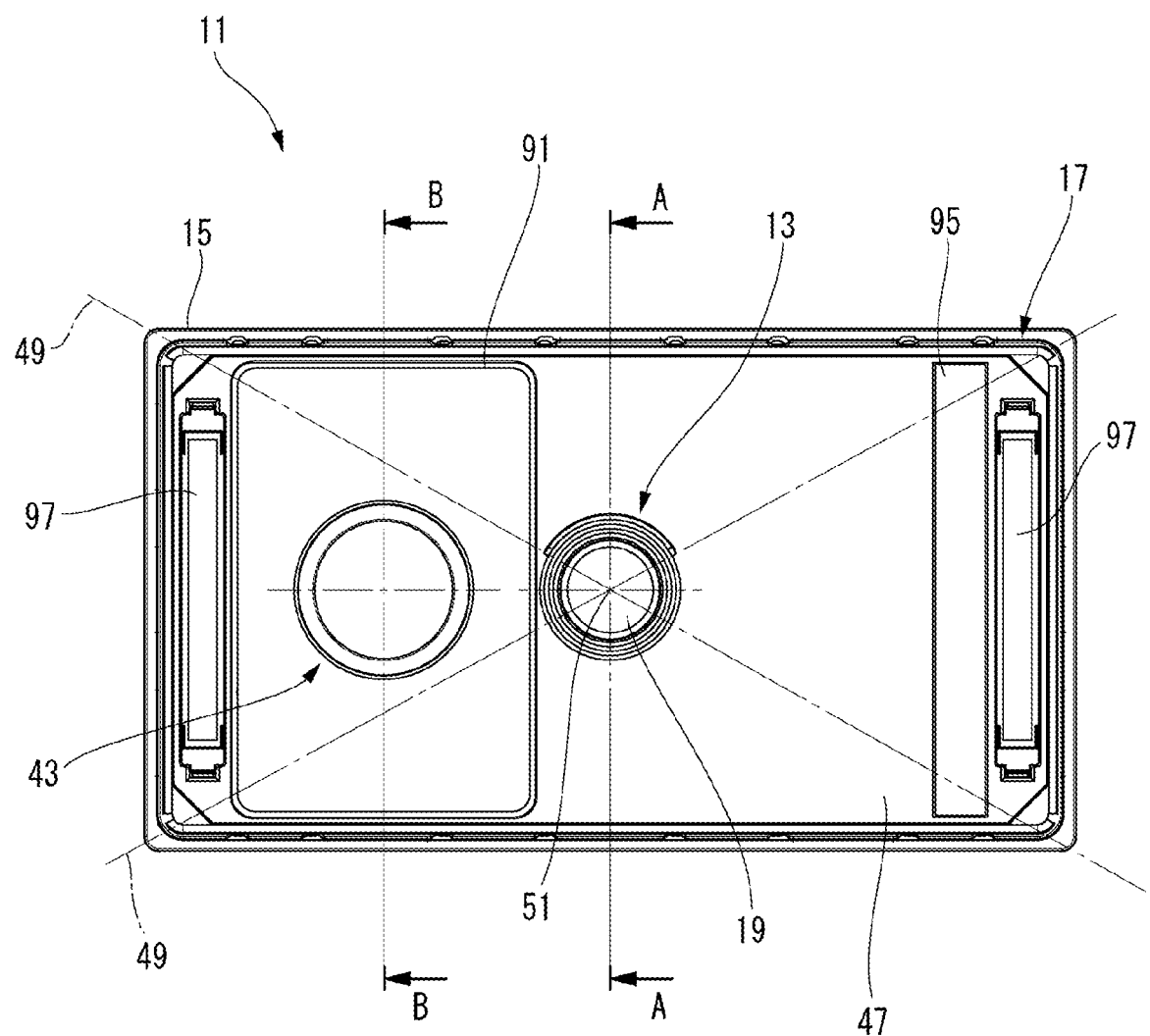
FIG. 4 is a front view of the window camera.

FIG. 4 is a front view of the window camera 11. The window camera 11 shown in FIG. 4 is a view seen from an attachment surface 47 side (that is, the outdoors).

The housing 15 is molded in a thin rectangular shape using, for example, a synthetic resin. The housing 15 is formed to include the rectangular attachment surface 47 that faces parallel to the indoor surface 29. In the housing 15, the lens 19 provided in the image capturing unit 13 is recessed in the attachment surface 47. The image capturing unit 13 is disposed such that the optical axis 53 of the lens 19 (see FIG. 5) is aligned with an intersection 51 of a pair of diagonal lines 49 of the housing 15 formed in the rectangular shape.

Figure 5:
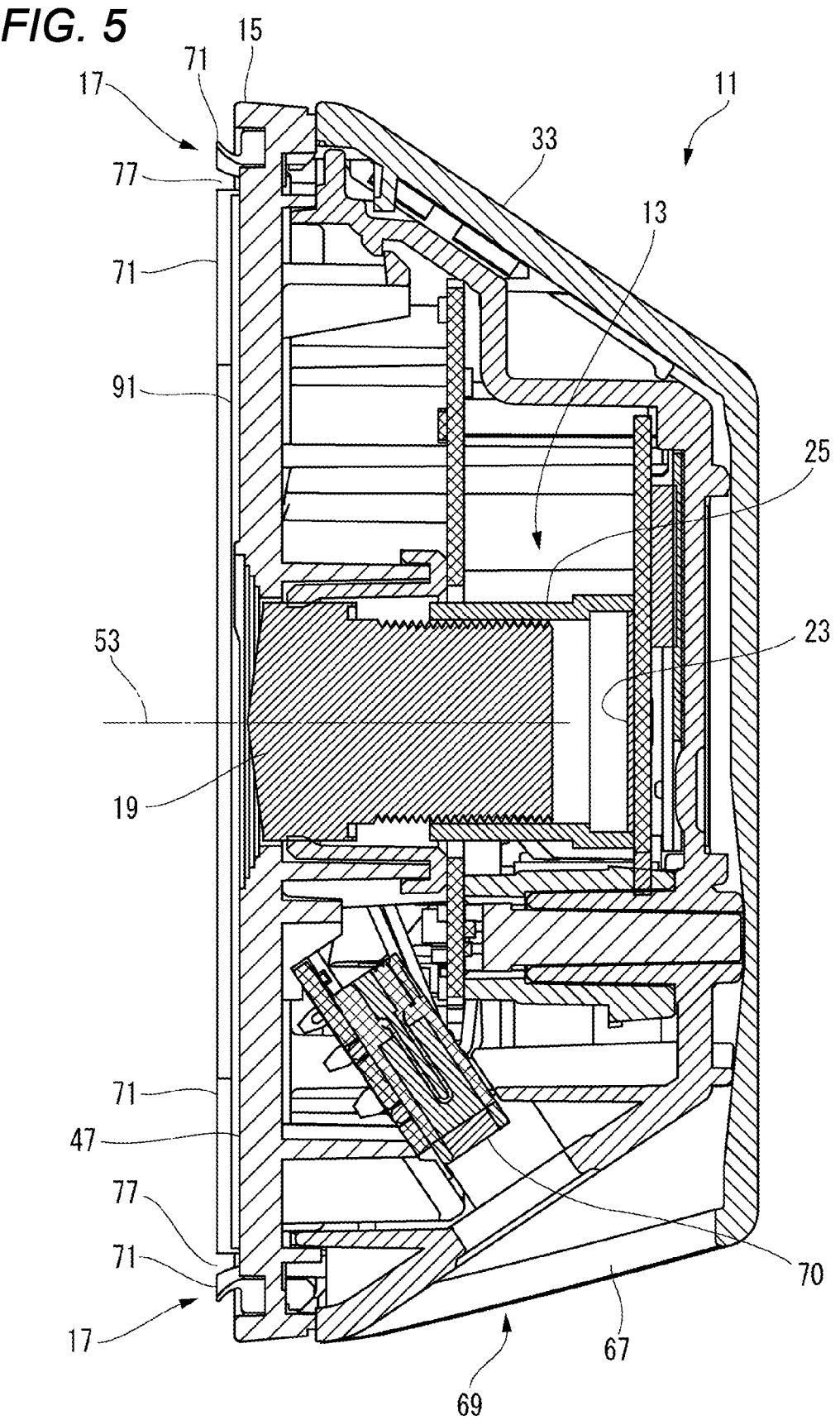
FIG. 5 is a cross-sectional view taken along a line A-A of FIG. 4.

FIG. 5 is a cross-sectional view taken along a line A-A of FIG. 4. FIG. 5 is a cross-sectional view that is taken along the cross-sectional line A-A and includes the optical axis 53 of the lens 19 of the image capturing unit 13.

The rectangular attachment surface 47 of the window camera 11 is formed with the same aspect ratio as that of an image capturing region of the image capturing unit 13 (that is, a sensor detection region of the image sensor 23). The aspect ratio of the image capturing region of the image capturing unit 13 provided in the window camera 11 is 16:9 as a ratio of a longer side to a shorter side.

Figure 6:
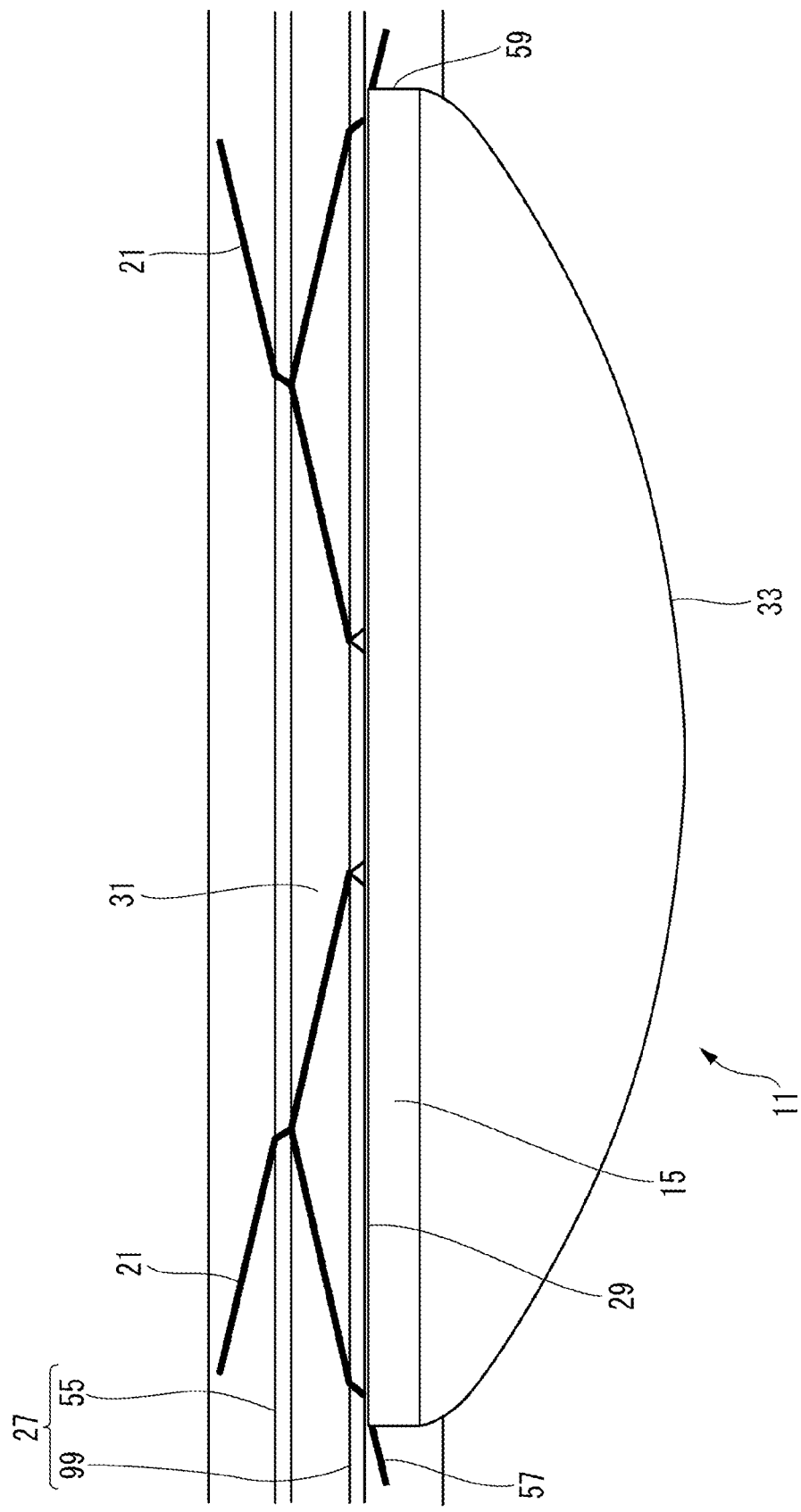
FIG. 6 is a diagram illustrating an example of a reflection path of indoor light through a window.

FIG. 6 is a diagram illustrating an example of a reflection path of indoor light 57 through the window 27. As described above, in the window camera 11, the attachment surface 47 is formed with an aspect ratio of 16:9 that is the same as that of the image capturing region (the sensor detection region).

In the housing 15, a peripheral wall 61 (see FIG. 3) that stands along a rectangular outer shape of the housing 15 is formed on a back surface of the attachment surface 47 (the indoor side). The image capturing unit 13, the operation panel 41, the suction cup suction mechanism 45, a control substrate 63 (see FIG. 10), a heat dissipation portion 65 formed of metal (see FIG. 10), and the like are arranged inside the peripheral wall 61. The back cover 33 is fitted and fixed to the peripheral wall 61 of the housing 15. The housing 15 includes ventilation holes 69 respectively on a left side and a right side of the peripheral wall 61 on a lower side. In the ventilation hole 69, a plurality of slits 67 are opened in parallel. Further, the housing 15 includes a power connector 70 (see FIG. 5) exposed from the back cover 33 at a central portion of the peripheral wall 61 on the lower side.

An alternating current (AC) adapter is connected to the power connector 70 to supply power to the image capturing unit 13, the control substrate 63, or the like.

The light-shielding lip 17 is formed of an elastic material, protrudes from the attachment surface 47 toward the indoor surface 29 of the window 27, and shields the indoor light 57. The light-shielding lip 17 is formed in a substantially rectangular frame shape along an outer shape of the attachment surface 47. That is, as shown in FIG. 2, the light-shielding lip 17 is configured in the rectangular frame shape by a pair of lips 71 in a long side direction and a pair of lips 71 in a short side direction. The light-shielding lip 17 is provided by fitting a lip main body portion 75 formed in a quadrangular cross section into a peripheral groove 73 (see FIG. 2) recessed around the attachment surface 47. In the light-shielding lip 17, the fin-shaped lips 71 are inclined and protrude from the lip main body portion 75 toward the outside, that is, from the attachment surface 47 toward the indoor side glass 99. In the light-shielding lip 17, when the housing 15 is installed on the window 27, the lips 71 are elastically deformed by a suction force obtained by the suction cup piece 43 suctioning the window 27, and a gap between the indoor surface 29 and the attachment surface 47 is closed such that light can be shielded.

The light-shielding lip 17 may be configured as four lips in which the pair of lips 71 in the long side direction and the pair of lips 71 in the short side direction are separated at four locations corresponding to four corners of the housing 15. The light-shielding lip 17 according to the first embodiment is configured with four light-shielding lips in which four sides are separated at the four locations corresponding to the four corners of the housing 15. Further, when one light-shielding lip is used, the light-shielding lip may be provided with some cuts 77 (see FIG. 2) at the four locations corresponding to the four corners of the housing 15. Accordingly, the light-shielding lip 17 can prevent the lips 71 from being curled or bent. Further, when the lips 71 are elastically deformed and collapsed, the cuts 77 collapse together to close the gap between the indoor surface 29 and the attachment surface 47 such that light can be shielded.

In the light-shielding lip 17 of the window camera 11, a tip end side that protrudes toward the indoor surface 29 is formed in a tapered shape that opens outward (from the housing 15 toward the indoor side glass 99) (see FIG. 5). Since the light-shielding lip 17 is formed in the tapered shape that opens outward, when a tip end of the light-shielding lip 17 is in contact with the indoor surface 29, the light-shielding lip 17 can be expanded in a direction from a center of the housing 15 (the intersection 51) toward outside (four corners of the rectangular shape of the housing 15). Accordingly, when the window camera 11 is attached to the window 27, the light-shielding lip 17 is pressed against the indoor surface 29 by suction of the suction cup piece 43, and can maintain a state of being in contact with the indoor surface 29.

Figure 7:
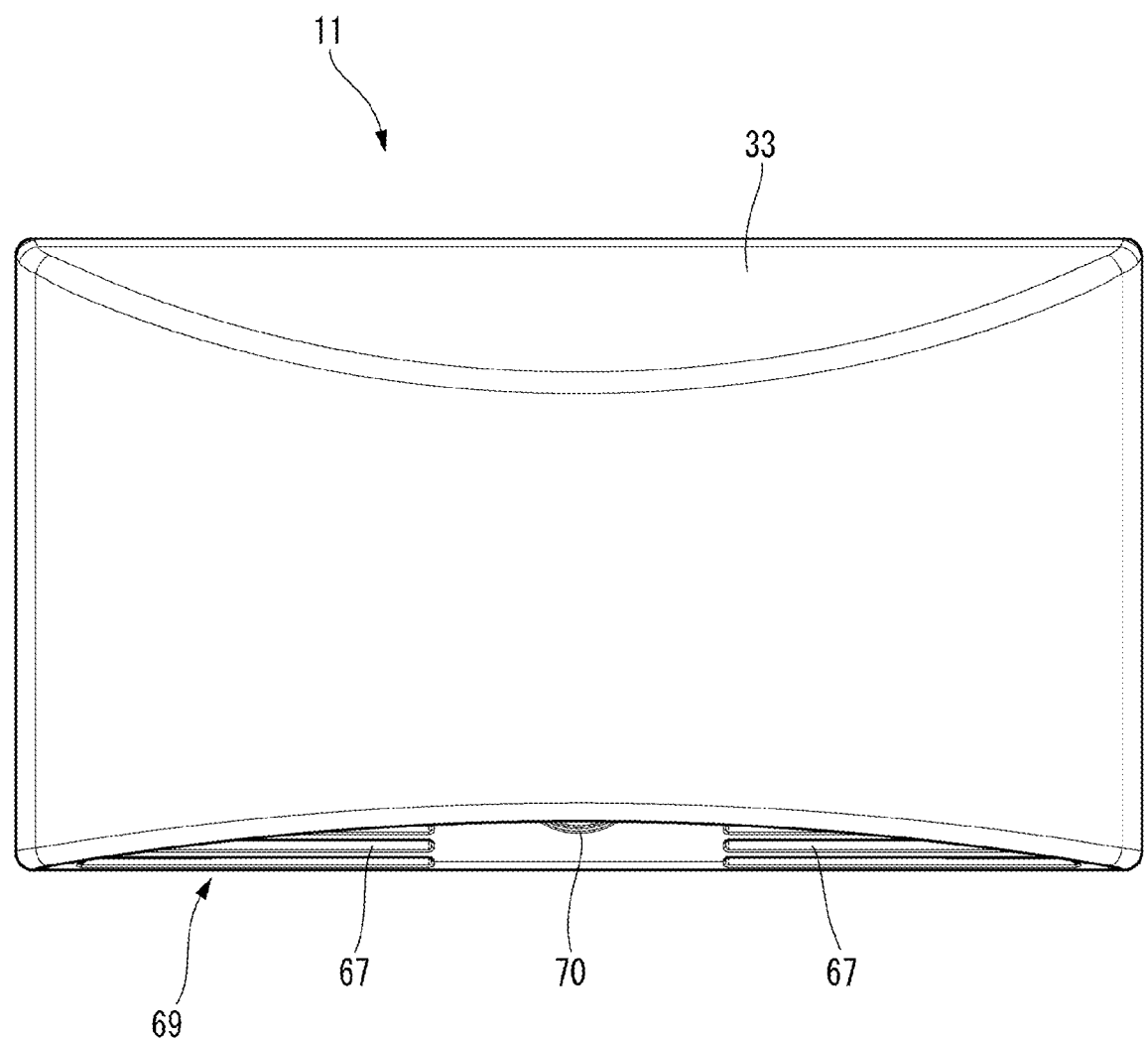
FIG. 7 is a rear view of the window camera.

FIG. 7 is a rear view of the window camera 11. In the window camera 11, a back surface of the housing 15 is covered by the back cover 33. The back cover 33 is formed in a convex-curved surface shape in which a central portion of the back cover 33 protrudes toward a rear side (the indoor side). Further, the back cover 33 is formed to have a curve in which long sides of the back cover 33 gradually approach toward a center.

Figure 8:
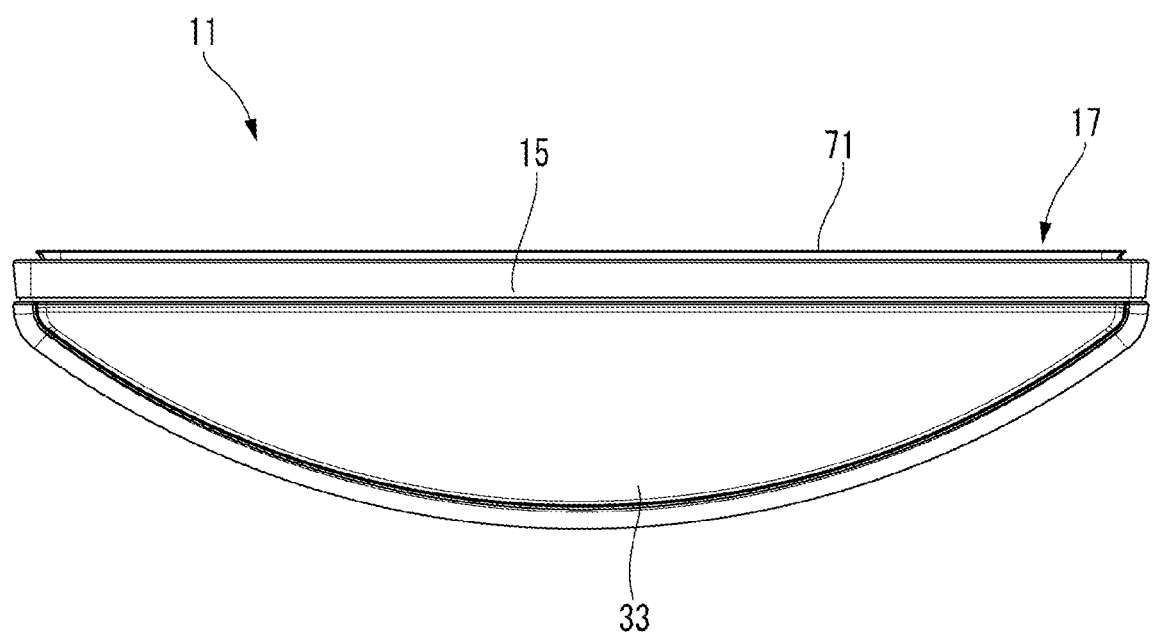
FIG. 8 is a plan view of the window camera.

FIG. 8 is a plan view of the window camera 11. In a state where the window camera 11 is not attached to the window 27, the tip end of the light-shielding lip 17 slightly protrudes from the attachment surface 47.

The tip end of the light-shielding lip 17 is elastically deformed and collapsed when the housing 15 is suctioned to the indoor surface 29 by the suction cup suction mechanism 45, closes a space between the housing 15 and the indoor surface 29, and cannot be substantially seen in a plan view. Since the light-shielding lip 17 is formed in the tapered shape that opens outward as described above, the tip end thereof is further expanded in the direction from the center of the housing 15 (the intersection 51) toward the outside (the four corners of the housing 15 formed in the rectangular shape) by being suctioned and collapsed.

Figure 9:
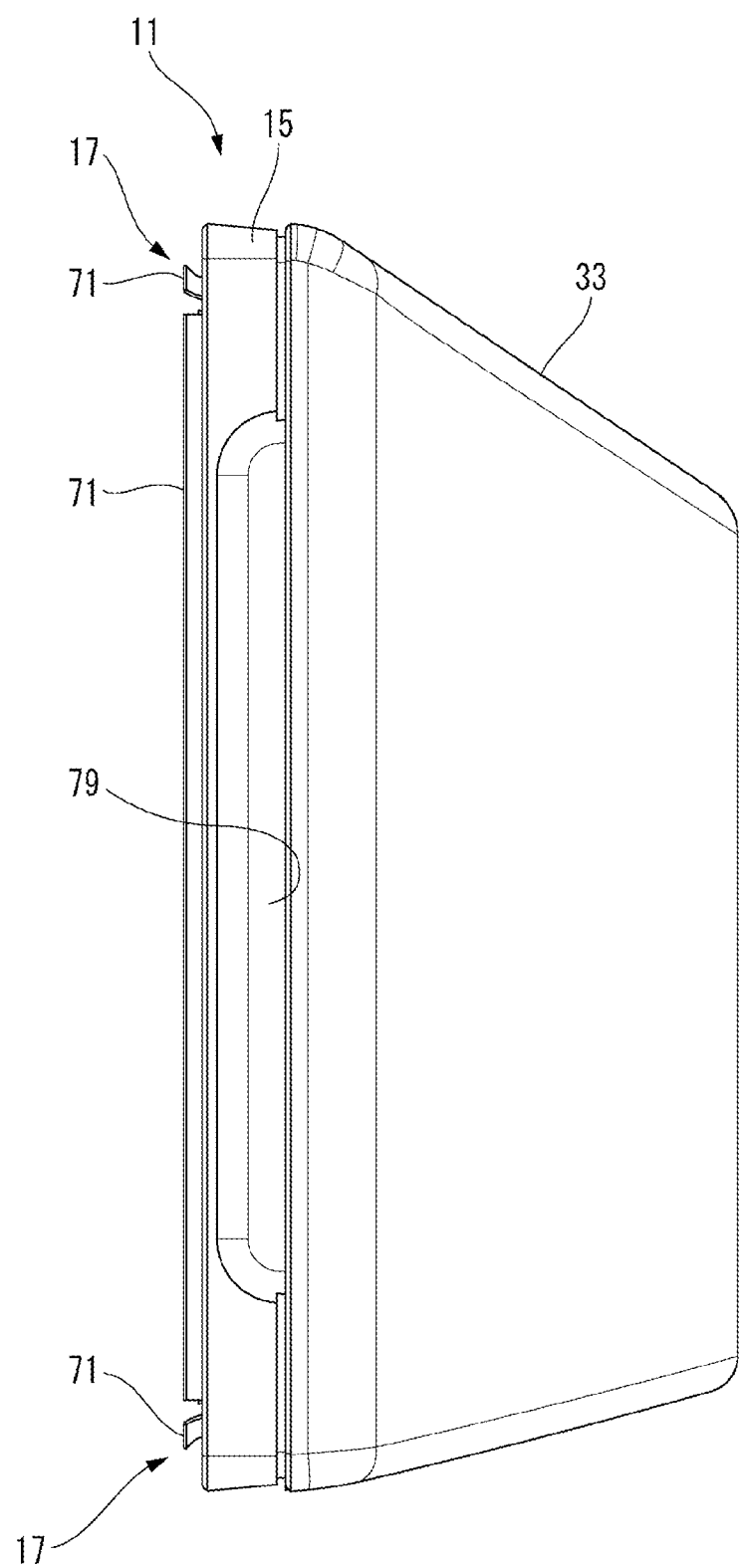
FIG. 9 is a side view of the window camera.

FIG. 9 is a side view of the window camera 11. The window camera 11 includes, in both side portions of the housing 15, recesses 79 for hooking fingers of the user. When the back cover 33 is removed from the housing 15, the recess 79 serves as an insertion portion of a finger of the user.

In a side view in a state where the window camera 11 is not attached to the window 27, the lips 71 in the long side direction can be seen in an upper-lower direction. Further, the lips 71 in the short side direction can be seen between the upper and lower lips 71 in the long side direction.

Figure 10:
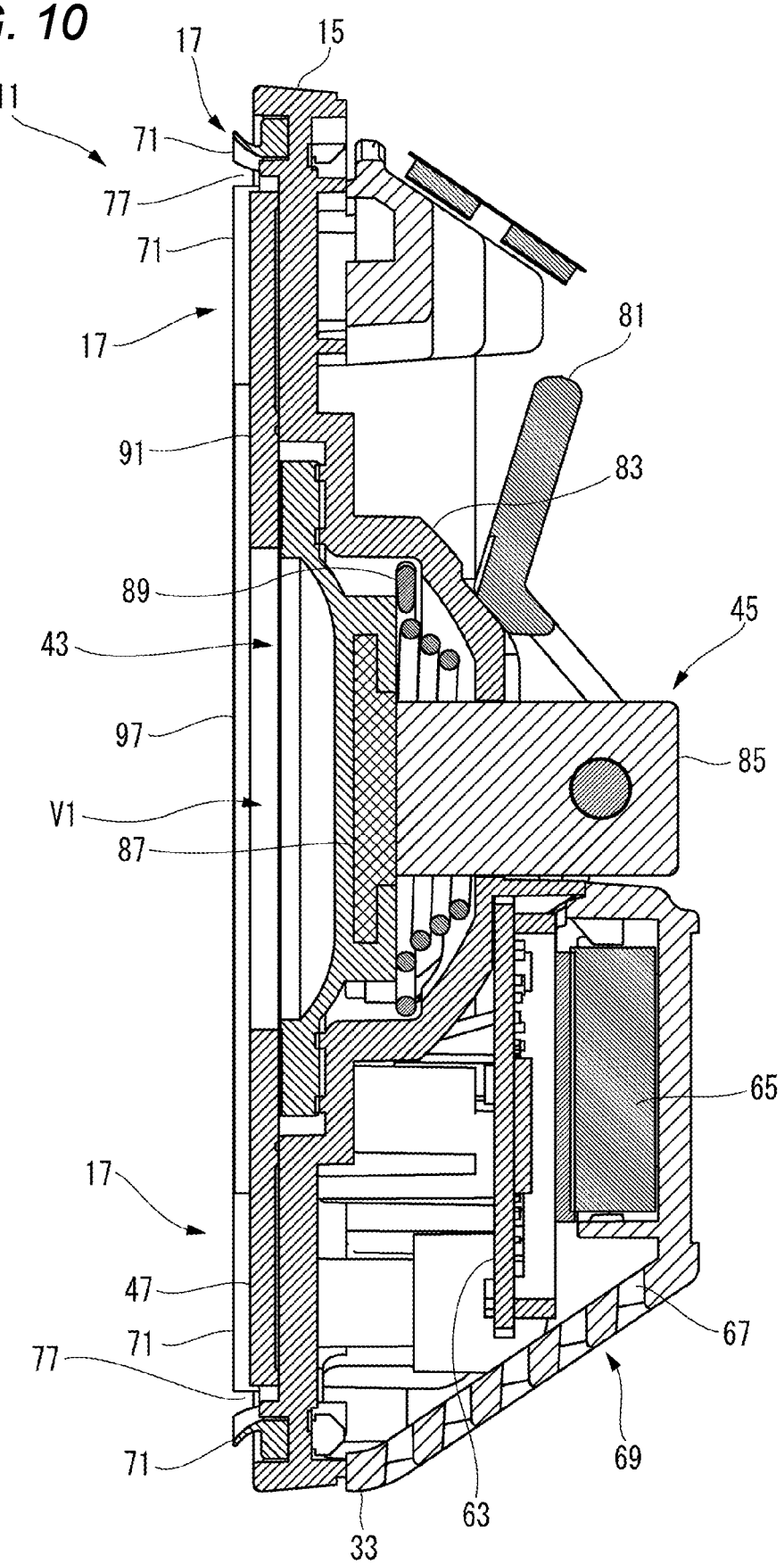
FIG. 10 is a cross-sectional view taken along a line B-B in a suction state of a suction cup piece.

FIG. 10 is a cross-sectional view taken along a line B-B in a suction state of the suction cup piece 43. In FIG. 10, an operation lever 81 is pushed up toward a housing 15 side to bring the suction cup piece 43 into a suction state where the suction cup piece 43 is suctioned to the indoor surface 29.

The suction cup suction mechanism 45 includes the suction cup piece 43, the operation lever 81, and a mechanism housing 83. The suction cup suction mechanism 45 causes the suction cup piece 43 to be suctioned to the indoor surface 29 by generating a negative pressure in the suction cup piece 43 relative to an indoor atmospheric pressure. The suction plate 91 is disposed side by side with the image capturing unit 13 in a longitudinal direction of the housing 15. Further, the suction plate 91 is adhered to the suction cup piece 43 and integrally formed, and implements a function of a suction cup that suctions the window camera 11 on the window 27.

The operation lever 81 is rotatably supported by the mechanism housing 83. The operation lever 81 is operated by the user, and is operated in a pushing-up direction in which the operation lever 81 is pushed up toward the housing 15 in a state where the housing 15 is in contact with the attachment surface 47.

In the window camera 11, when the suction plate 91 of the housing 15 is attached to (that is, in contact with) the indoor surface 29 by the user, a space V1 surrounded by the suction cup piece 43, the indoor surface 29, a movable plate portion 87, and the suction plate 91.

A holding rod 85 is formed integrally with the suction cup piece 43 and the suction plate 91. The holding rod 85 includes the movable plate portion 87 that moves in a direction parallel to a direction of the optical axis 53 of the image capturing unit 13 in conjunction with a rotation operation of the operation lever 81. In conjunction with the rotation operation of the operation lever 81, the movable plate portion 87 stretches the suction cup piece 43 in a direction away from the indoor surface 29 so as to expand the space V1.

Here, a release spring 89 is biased and disposed by the movable plate portion 87 in a direction approaching the indoor surface 29.

The space V1 is expanded by stretching the suction cup piece 43 in the direction away from the indoor surface 29 based on an operation of the operation lever 81 by the user, and is in a negative pressure state. Accordingly, the suction cup including the suction cup piece 43, the holding rod 85, and the suction plate 91 is suctioned to the indoor side glass 99 and is in a suction state.

The window camera 11 includes a Wi-Fi (registered trademark) chip (not shown) on the control substrate 63. The Wi-Fi (registered trademark) chip can transmit and receive data to and from a terminal apparatus such as a smartphone, a tablet, and a personal computer (PC) by using wireless communication via a wireless local area network (LAN) such as Wi-Fi (registered trademark). The window camera 11 transmits data of a captured video to a terminal apparatus connected such that wireless communication is enabled.

Figure 11:
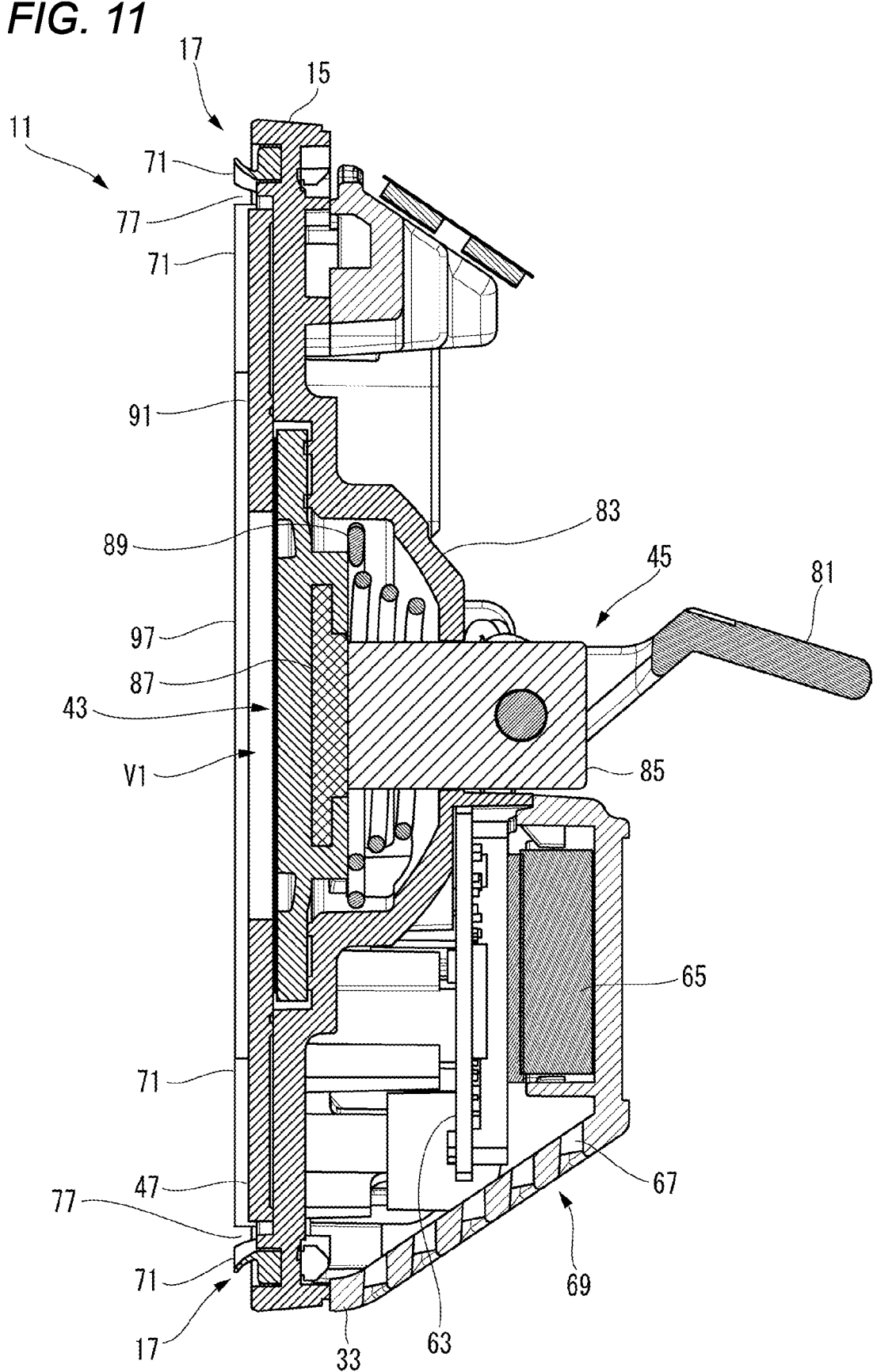
FIG. 11 is a cross-sectional view taken along a line B-B in a suction release state of the suction cup piece.

FIG. 11 is a cross-sectional view taken along a line B-B in a suction release state of the suction cup piece 43. In FIG. 11, the operation lever 81 is pushed down so as to move away from the housing 15 to bring the suction cup piece 43 into the suction release state.

When being operated by the user and operated in a pushing-down direction away from the housing 15, the operation lever 81 receives an elastic force of the release spring 89 and moves in a direction in which the movable plate portion 87 approaches the indoor surface 29 via the holding rod 85. Accordingly, the suction cup piece 43 is expanded and contracted to return to an original shape. Therefore, the space V1 formed by the suction cup piece 43, the indoor surface 29, the movable plate portion 87, and the suction plate 91 changes from a negative pressure state to the same atmospheric pressure as an indoor atmospheric pressure, and is in the suction release state. As described above, the window camera 11 can be removed from the indoor side glass 99 (the indoor surface 29).

As shown in FIG. 2, the suction cup piece 43 of the window camera 11 is disposed at a center of the suction plate 91 formed of an elastic material. As shown in FIG. 10, the suction plate 91 protrudes from the attachment surface 47 with a thickness the same as a protrusion length of the light-shielding lip 17 in a non-deformed state. Further, as shown in FIG. 4, the suction plate 91 is adhered to the attachment surface 47 with a quadrangular suction area that is substantially half of the attachment surface 47 in the longitudinal direction, in which the attachment surface 47 sandwiches the lens 19. The suction plate 91 is formed of an elastic material, and is preferably formed of, for example, silicon rubber. The suction plate 91 has adhesiveness because the suction plate 91 is formed of the elastic material, and adheres to the indoor side glass 99 to which the window camera 11 is attached to prevent slipping, so that the suction plate 91 can support attachment of the window camera 11.

In the window camera 11, the double-sided tapes 97 for attaching the window camera 11 to the window 27 are attached along respective short sides of the attachment surface 47. Accordingly, the window camera 11 can be attached by sticking the housing 15 to the window 27 by the double-sided tapes 97. Therefore, the window camera 11 can be reliably stuck to the window 27 by using not only the suction cup piece 43 but also the double-sided tapes 97. Further, by sticking the double-sided tapes 97 first, the user can attach the suction cup piece 43 to the window 27 without displacement when suctioning the suction cup piece 43. The double-sided tapes 97 can be stuck to the window 27 without using the suction cup piece 43.

Figure 12:
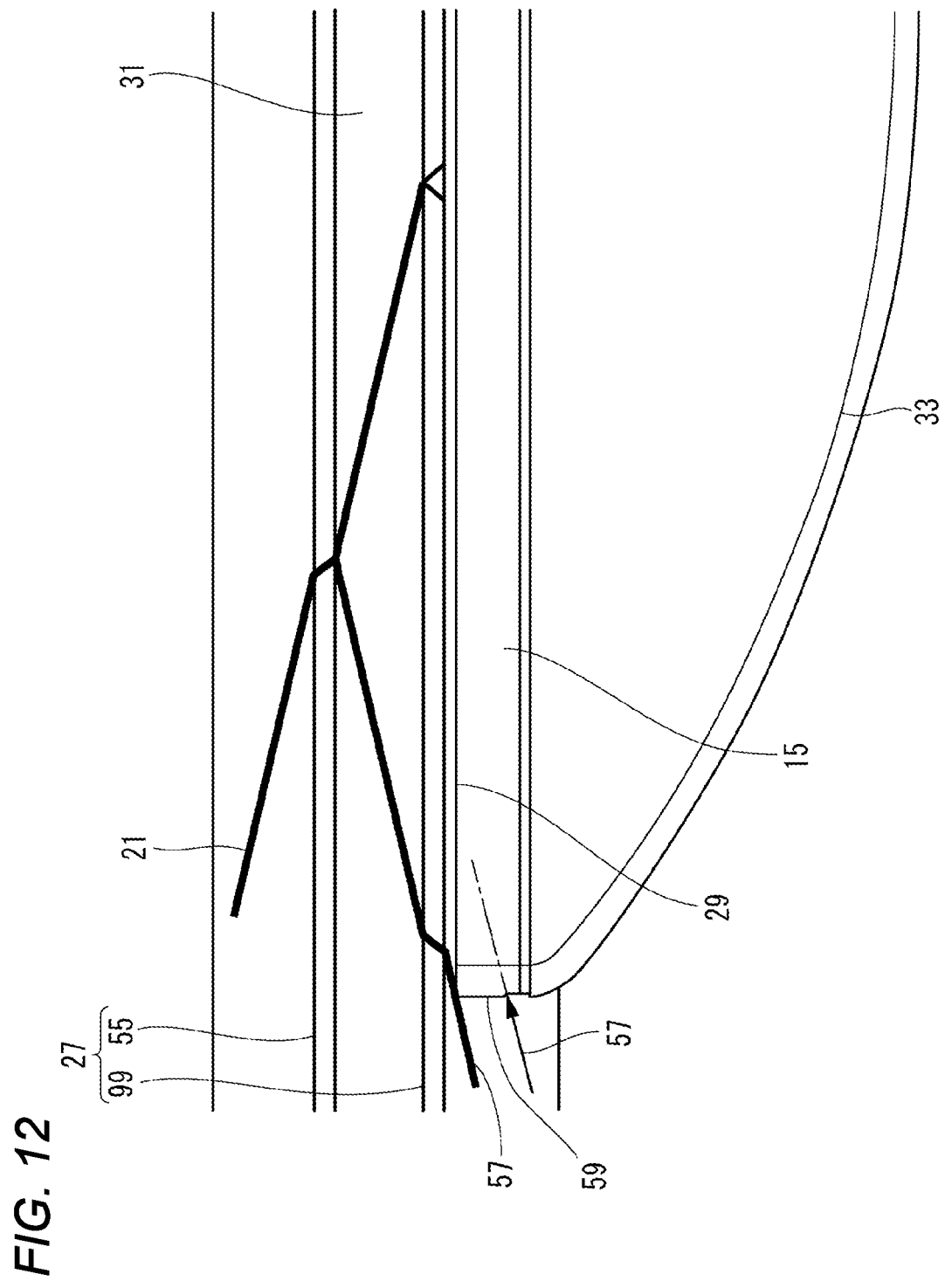
FIG. 12 is an enlarged view of a main part of an example of the reflection path of the indoor light through the window.

FIG. 12 is an enlarged view of a main part of an example of the reflection path of the indoor light 57 through the window 27.

The window camera 11 shields the indoor light 57 reflected by an outdoor side glass 55 farther than the image capturing unit 13 by a peripheral edge 59 that is an outer shape of the housing 15. That is, the indoor light 57 that tends to be incident on an inner side of the lens 19 more than the indoor light 57 of FIG. 12 is shielded by the peripheral edge 59 of the housing 15. Accordingly, the window camera 11 can shield the indoor light 57, which passes through the indoor side glass 99, is reflected by an inner surface of the outdoor side glass 55, and enters the lens 19, by the rectangular peripheral edge 59 of the housing 15. In the window camera 11, the indoor light 57 is similarly shielded by the peripheral edge 59 of the housing 15 on the long sides of the housing 15.

In a gap between the indoor surface 29 and the attachment surface 47 that is generated when the housing 15 is attached to the indoor surface 29 of the window camera 11, the light-shielding lip 17 is elastically deformed and adheres along the indoor surface 29 of the window 27. Therefore, the window camera 11 can close, by the light-shielding lip 17, a gap generated by slight unevenness of the indoor surface 29 so as to shield light.

Figure 13:
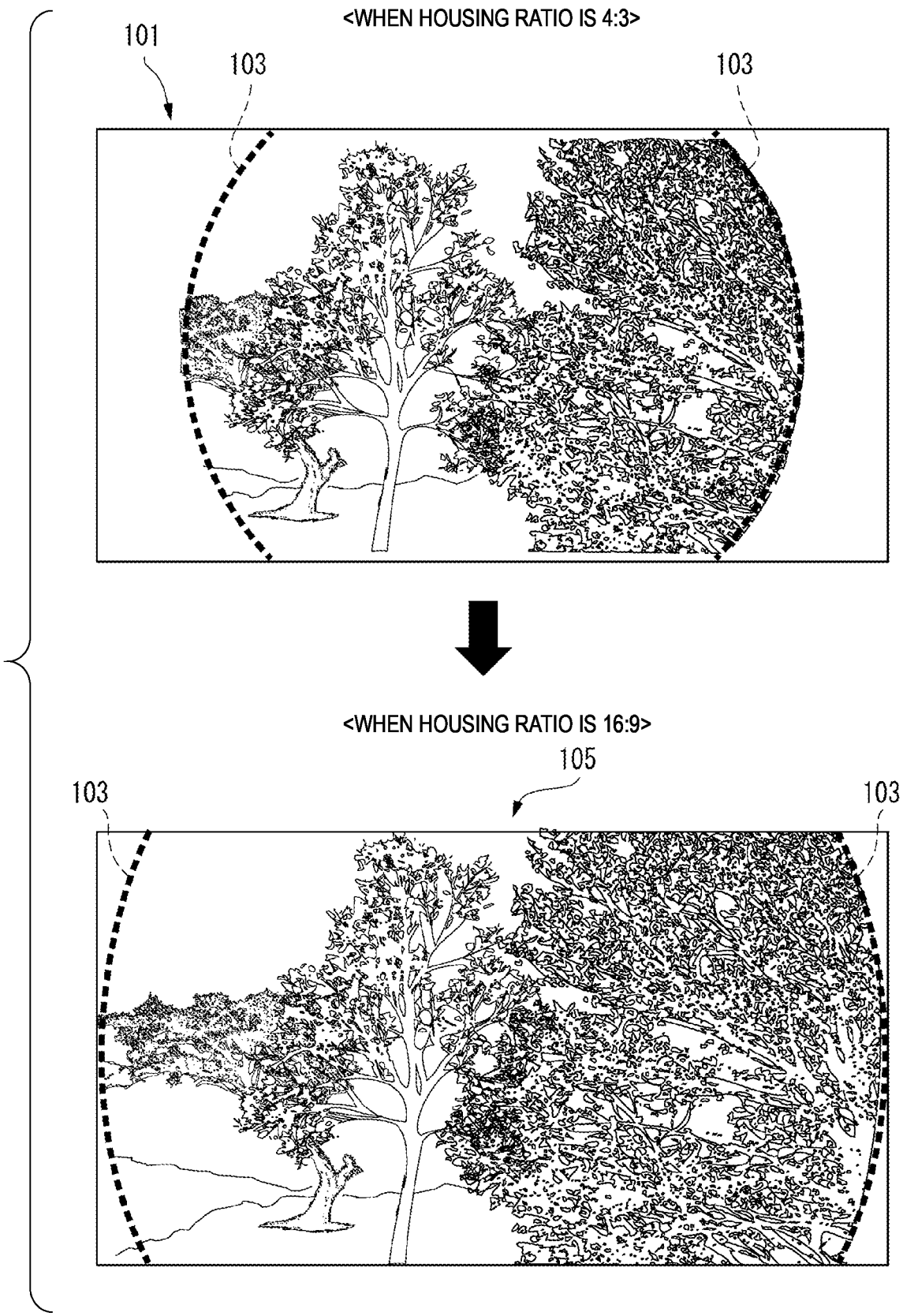
FIG. 13 is a diagram showing a comparative example of a captured image captured in accordance with an aspect ratio of an attachment surface.

FIG. 13 is a diagram showing a comparative example of a captured image captured in accordance with an aspect ratio of the attachment surface 47.

A captured image 101 is a captured image captured when an aspect ratio of the attachment surface 47 is, for example, 4:3. When the attachment surface 47 is formed with an aspect ratio different from that of an image capturing region of the image capturing unit 13, the captured image 101 obtained by the indoor light 57 reflected by the outdoor side glass 55 being incident on the image capturing region of the image capturing unit 13 is acquired. In such a case, an edge 103 of the lens 19 is reflected outside a light-shielding range. Such reflection becomes more noticeable when outdoors is darker than indoors.

As described above, a window camera 11 according to a first embodiment includes: an image capturing unit 13 configured to capture an image of outdoors from an indoor surface 29 of a window 27; a housing 15 that includes a rectangular attachment surface 47 that faces parallel to the indoor surface 29, in which a lens 19 of the image capturing unit 13 is recessed in the attachment surface 47, and in which an optical axis 53 of the lens 19 is aligned with an intersection 51 of a pair of diagonal lines 49 of the attachment surface; and a light-shielding lip 17 that is formed of an elastic material, protrudes from the attachment surface 47 toward the indoor surface 29, is formed in a rectangular frame shape along an outer shape of the attachment surface 47, and is elastically deformed by pressing from the housing 15 so as to close a gap between the indoor surface 29 and the attachment surface 47.

Accordingly, the window camera 11 according to the first embodiment can be installed on the window 27, and can improve image quality of a captured image by more accurately preventing reflection of indoor light due to reflection on the window 27. Further, the attachment surface 47 of the window camera 11 according to the first embodiment is provided with the rectangular frame-shaped light-shielding lip 17 along the outer shape of the attachment surface 47 (a contour). Since the light-shielding lip 17 is elastically deformed by a pressing force from the housing 15 suctioned to the indoor surface 29 of the window 27 by the suction cup piece 43 or the like to close the gap between the indoor surface 29 and the attachment surface 47, even when the window camera 11 is attached to the window 27 including, for example, two or more glasses, the image quality of the captured image can be improved by more accurately preventing the reflection of the indoor light due to the reflection on the window 27.

Even when a plurality of windows function as multi-layer glass when a window on a side opposite to a window to which the window camera 11 is attached is opened, the window camera 11 according to the first embodiment can prevent reflection due to the indoor light by the light-shielding lip 17, and can improve the image quality of the captured image.

In the light-shielding lip 17 provided in the window camera 11 according to the first embodiment, a tip end side that protrudes toward the indoor surface 29 is formed in a tapered shape that opens outward. That is, when the housing 15 is attached to the indoor surface 29 of the window 27, the light-shielding lip 17 is elastically deformed by the pressing force from the housing 15, and is deformed and collapsed such that the taper opens further outward. Therefore, the light-shielding lip 17 expands with a tip end in close contact with the indoor surface 29, and can maintain the state of being in contact with the indoor surface 29. Accordingly, even when the housing 15 is pressed against and fixed to the indoor surface 29 by the suction cup piece 43 or the like, the window camera 11 according to the first embodiment can further shield the indoor light 57 that tends to enter the lens 19 through the gap between the attachment surface 47 and the indoor surface 29 without the light-shielding lip 17 being curled or bent, and can improve the image quality of the captured image.

In the window camera 11 according to the first embodiment, the attachment surface 47, which is formed in a rectangular shape, is formed with the same aspect ratio as that of the image capturing region of the image capturing unit 13 (the sensor detection region of the image sensor 23). That is, the rectangular attachment surface 47 and the image capturing region of the image capturing unit 13 (the sensor detection region of the image sensor 23) have similar shapes. That is, in the window camera 11, the attachment surface 47 of the housing 15 is formed with the same aspect ratio as that of the image capturing region. Short sides of the rectangular attachment surface 47 are parallel to short sides of the sensor detection region, and long sides of the rectangular attachment surface 47 are parallel to long sides of the sensor detection region. That is, the attachment surface 47 and the image capturing region of the image capturing unit 13 have substantially similar shapes. Accordingly, the window camera 11 according to the first embodiment can efficiently shield, by the peripheral edge 59 of the outer shape of the housing 15, unnecessary reflected light incident on a region other than the sensor detection region formed with the aspect ratio.

The aspect ratio of the attachment surface 47 of the window camera 11 according to the first embodiment is 16:9 as a ratio of a longer side to a shorter side. Accordingly, the window camera 11 according to the first embodiment can efficiently shield, by the peripheral edge 59 of the outer shape of the housing 15, unnecessary reflected light incident on a region other than the sensor detection region formed with the aspect ratio. The aspect ratio of the attachment surface 47 is not limited thereto, and may be similar to that of the image capturing region.

The housing 15 of the window camera 11 according to the first embodiment further includes: a suction cup piece 43 that is provided on the attachment surface 47 and formed of an elastic material; a suction plate 91 that is provided on the attachment surface 47 and configured to close a gap between the indoor surface 29 and the attachment surface 47; a movable plate portion 87 configured to stretch the suction cup piece 43 in a direction parallel to a direction of the optical axis 53 of the image capturing unit 13; and a suction cup suction mechanism 45 configured to stretch the suction cup piece by moving the movable plate portion in conjunction with a rotation operation of an operation lever 81, and expand a space V1 formed by the suction cup piece, the indoor surface, the suction plate, and the movable plate portion to generate a negative pressure in the space V1. Accordingly, the window camera 11 according to the first embodiment can be easily attached by suctioning the housing 15 to the window camera 11 by the rotation operation of the operation lever 81 of the suction cup suction mechanism 45. Accordingly, the window camera 11 does not have to directly fix the housing 15 to the window by using the double-sided tapes 97. Therefore, regarding the window camera 11, an attachment position of the window camera 11 can be easily changed by the user, and an adhesive material of double-sided adhesive tapes does not remain peeled off after being removed.

In the window camera 11, the suction cup piece 43 is disposed at a center of the suction plate 91 formed of an elastic material, and the suction plate 91 protrudes from the attachment surface 47 with a thickness the same as a protrusion length of the light-shielding lip 17 in a non-deformed state, and is adhered to the attachment surface 47 with a quadrangular suction area that is substantially half of the attachment surface 47 in the longitudinal direction, in which the attachment surface 47 sandwiches the lens 19.

The suction cup piece 43 of the window camera 11 according to the first embodiment is disposed at the center of the suction plate 91. The suction plate 91 protrudes from the attachment surface 47 with a thickness the same as the protrusion length of the light-shielding lip 17 in a non-deformed state, and is provided on the attachment surface 47 with a substantially rectangular suction area that is adjacent to the image capturing unit 13 and substantially half of the attachment surface 47 in the longitudinal direction. Accordingly, the window camera 11 according to the first embodiment can maintain airtightness of the space V1 that is in a negative pressure state rather than in an atmospheric pressure. Further, the suction plate 91 is formed of an elastic material, and is in contact with the indoor surface 29 with a large suction area that is substantially half of the attachment surface 47. Therefore, the window camera 11 can improve a fixing force to the indoor surface 29 by suctioning to the indoor surface 29 because of a suction property of the suction plate 91.

Although the embodiment has been described above with reference to the accompanying drawings, the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the embodiment mentioned above may be combined optionally in the range without deviating from the spirit of the invention.

The present disclosure is useful as a presentation of a window camera that can be installed on a window and more accurately prevents reflection of indoor light due to reflection on a window glass to improve image quality of a captured image.

The invention claimed is:

1. A window camera comprising:
   an image capturing unit configured to capture an image of outdoors from an indoor surface of a window;
   a housing comprising an attachment surface having a rectangular shape and facing in parallel with the indoor surface, the housing in which the image capturing unit is provided to be recessed in the attachment surface such that an optical axis of the image capturing unit extends through a center of the attachment surface;
   a light-shielding member protruding from the attachment surface toward the indoor surface and having a rectangular frame shape along an outer shape of the attachment surface, the light-shielding member being formed of an elastic material and elastically deformable by pressing from the housing to close a gap between the indoor surface and the attachment surface; and
   a suction cup provided on the attachment surface on an inner side of the light-shielding member, the light-shielding member being provided along the outer shape of the attachment surface,
   wherein the center of the attachment surface through which the optical axis of the image capturing unit extends, is positioned within an area of the attachment surface surrounded by the light-shielding member, and the entire suction cup is provided within the area of the attachment surface.

2. The window camera according to claim 1, wherein the light-shielding member is formed such that a tip end side in a protruding direction toward the indoor surface is formed in a taper and opens outward.

3. The window camera according to claim 1, wherein the attachment surface has an aspect ratio the same as an aspect ratio of an image capturing region of the image capturing unit.

4. The window camera according to claim 3, wherein the aspect ratio is 16:9 as a ratio of a longer side to a shorter side.

5. The window camera according to claim 1, wherein the suction cup comprises:
   a suction cup piece provided on the attachment surface and formed of an elastic material; and
   a suction plate provided on the attachment surface and configured to close a gap between the indoor surface and the attachment surface;

wherein the housing further comprises:
  a movable plate portion configured to stretch the suction cup piece in a direction parallel to a direction of the optical axis; and
  a suction cup suction mechanism configured to stretch the suction cup piece by moving the movable plate portion in conjunction with a rotation operation of an operation lever so as to expand a space formed by the suction cup piece, the indoor surface, the suction plate, and the movable plate portion to generate a negative pressure in the space.

6. The window camera according to claim 5,
wherein the suction cup piece is disposed at a center of the suction plate, and
wherein the suction plate protrudes from the attachment surface with a thickness the same as a protrusion length of the light-shielding member in a non-deformed state, and the suction plate is provided adjacent to the image capturing unit on the attachment surface to have a rectangular suction area that extends less than half of the attachment surface in a longitudinal direction of the attachment surface.

7. A window camera comprising:
an image capturing unit configured to capture an image of outdoors from an indoor surface of a window;
a housing comprising an attachment surface having a rectangular shape and facing in parallel with the indoor surface, the housing in which the image capturing unit is provided to be recessed in the attachment surface such that an optical axis of the image capturing unit extends through an intersection of a pair of diagonal lines of the attachment surface; and
a light-shielding member protruding from the attachment surface toward the indoor surface and having a rectangular frame shape along an outer shape of the attachment surface, the light-shielding member being formed of an elastic material and elastically deformable by pressing from the housing to close a gap between the indoor surface and the attachment surface,
wherein the housing further comprises:
  a suction cup piece provided on the attachment surface and formed of an elastic material;
  a suction plate provided on the attachment surface and configured to close a gap between the indoor surface and the attachment surface;
  a movable plate portion configured to stretch the suction cup piece in a direction parallel to a direction of the optical axis; and
  a suction cup suction mechanism configured to stretch the suction cup piece by moving the movable plate portion in conjunction with a rotation operation of an operation lever so as to expand a space formed by the suction cup piece, the indoor surface, the suction plate, and the movable plate portion to generate a negative pressure in the space,
wherein the suction cup piece is disposed at a center of the suction plate, and
wherein the suction plate protrudes from the attachment surface with a thickness the same as a protrusion length of the light-shielding member in a non-deformed state, and the suction plate is provided adjacent to the image capturing unit on the attachment surface to have a rectangular suction area that extends less than half of the attachment surface in a longitudinal direction of the attachment surface.

8. The window camera according to claim 5,
wherein the suction cup piece is disposed at a center of the suction plate, and
wherein the suction plate protrudes from the attachment surface with a thickness the same as a protrusion length of the light-shielding member in a non-deformed state, and the suction plate is provided adjacent to the image capturing unit on the attachment surface to have a rectangular suction area,
the attachment surface includes a first region and a second region that sandwich the image capturing unit on the attachment surface in a longitudinal direction of the attachment surface, and the rectangular suction area of the suction plate is provided in the first region and is not provided in the second region.

* * * * *